US007234167B2

(12) United States Patent
Teblyashkin et al.

(10) Patent No.: US 7,234,167 B2
(45) Date of Patent: Jun. 19, 2007

(54) AUTOMATIC BUILDER OF DETECTION AND CLEANING ROUTINES FOR COMPUTER VIRUSES

(75) Inventors: Ivan Alexandrovich Teblyashkin, Aylesbury (GB); Viatcheslav Nikolaevich Peternev, Aylesbury (GB); Dmitry Olegovich Gryaznov, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 526 days.

(21) Appl. No.: 09/946,505

(22) Filed: Sep. 6, 2001

(65) Prior Publication Data

US 2003/0046558 A1 Mar. 6, 2003

(51) Int. Cl.
*G06F 15/18* (2006.01)
*G06F 9/455* (2006.01)
*G06F 11/00* (2006.01)
*G06F 12/14* (2006.01)

(52) U.S. Cl. ............................ 726/24; 713/188; 703/23; 703/26

(58) Field of Classification Search ................ 713/188, 713/200; 703/23, 26; 726/24
See application file for complete search history.

(56) References Cited

U.S. PATENT DOCUMENTS

| 5,349,655 | A | * | 9/1994 | Mann | 714/6 |
| 5,398,196 | A | * | 3/1995 | Chambers | 714/28 |
| 5,440,723 | A | * | 8/1995 | Arnold et al. | 714/2 |
| 5,485,575 | A | * | 1/1996 | Chess et al. | 714/38 |
| 5,696,822 | A | * | 12/1997 | Nachenberg | 713/200 |
| 5,854,916 | A | * | 12/1998 | Nachenberg | 703/21 |
| 6,338,141 | B1 | * | 1/2002 | Wells | 726/24 |
| 6,357,008 | B1 | * | 3/2002 | Nachenberg | 713/200 |

(Continued)

OTHER PUBLICATIONS

Kephart, Jeffrey O., Gregory B. Sorkin, Morton Swimmer, and Steve R. White. "Blueprint for a Computer Immune System." Proceedings of the 1997 International Virus Bulletin Conference, San Francisco, California, 1997. URL:www.research.ibm.com/antivirus/SciPapers/Kephart/VB97, accessed Mar. 22, 2007.*

(Continued)

*Primary Examiner*—Ayaz Sheikh
*Assistant Examiner*—Matthew Henning
(74) *Attorney, Agent, or Firm*—Zilka-Kotab, PC; Christopher J. Hamaty

(57) ABSTRACT

Virus fingerprint data is automatically generated for use in detecting computer viruses and virus removal data for use in removing computer viruses from infected files. The fingerprint generation technique serves to identify the infected virus carrying portions of a computer file and then search within those portions for matching blocks of bytes in excess of a certain size that are consistently located at a predetermined position within the infected computer file such that they may be used to reliably detect that computer virus when it is infecting different host computer files. The removal data generation mechanism serves to search the infected computer file against a clean version of that computer file to identify matching blocks. Critical data missing within the infected computer file may be found within the virus carrying portions by the application of various decryption techniques. Cutting points to remove the virus carrying portions are identified. The fingerprint data and the removal data are tested on pairs of clean and infected computer files to verify that they operate correctly.

13 Claims, 5 Drawing Sheets

U.S. PATENT DOCUMENTS 6,851,057 B1 *  2/2005   Nachenberg .................. 726/24
6,907,396 B1 *  6/2005   Muttik et al. .................. 703/22
6,976,271 B1 * 12/2005   Le Pennec et al. ........... 726/24
6,981,279 B1 * 12/2005   Arnold et al. ................. 726/22
6,983,486 B1 *  1/2006   Hanchett ...................... 726/22

OTHER PUBLICATIONS

Jeffrey O. Kephart and William C, "Arnold. Automatic Extraction of Computer Virus Signatures", 4th Virus Bulletin International Conference, pp. 178-184, 1994.*

* cited by examiner

AUTOMATIC BUILDER OF DETECTION AND CLEANING ROUTINES FOR COMPUTER VIRUSES

BACKGROUND OF THE INVENTION

This invention relates to the field of data processing systems. More particularly, this invention relates to the field of the building of detection and cleaning mechanisms for use against computer viruses.

It is known to provide systems that detect and remove known computer viruses from computer files infected with those known computer viruses. When a new computer virus is released by a virus author, it generally rapidly comes to the notice of anti-virus system providers. These anti-virus system providers must then analyse the new computer virus to identify distinct characteristics of computer files infected with that computer virus such that they may provide a detection mechanism to their customers. In addition, the anti-virus providers must also analyse the computer files infected with the new computer virus to determine a way of removing the new computer virus from the computer file in question and recovering as much data as possible.

The steps of identifying detection and cleaning techniques are typically performed by an experienced computer programmer in the field of anti-virus systems who is able to analyse an infected computer file to identify the virus portions and develop a detection and cleaning mechanism for the new virus. However, the number of new viruses and variants of existing viruses is increasing such that it is difficult for anti-virus system providers to keep pace with the release of new viruses. Furthermore, steps that can increase the speed with which virus detection and virus cleaning mechanisms can be developed and released to customers are strongly advantageous since a new virus will typically have then spread to a lesser extent and have caused less damage than if the release of the detection and cleaning mechanisms took longer.

SUMMARY OF THE INVENTION

Viewed from one aspect the present invention provides a computer program product including a computer program for controlling a computer to automatically generate virus fingerprint data for use in detecting computer files infected with a computer virus, said computer program comprising:

comparison logic operable for each of a plurality of computer files to compare a computer file infected with said computer virus with a version of said computer file not infected with said computer virus to identify virus carrying portions of said computer file infected with said computer virus that are not present within said version of said computer file not infected with said computer virus;

block searching logic operable to search within said virus carrying portions of said plurality of computer programs infected with said computer virus for a matching block of code exceeding a threshold block size;

pointer searching logic operable to search within said plurality of computer files infected with said computer virus for a common pointer definition identifying a position of said matching block of code within each of said plurality of computer files infected with said computer virus; and fingerprint generating logic operable to generate virus fingerprint data representing said matching block of code and said common pointer definition such that said fingerprint data may be applied to a computer file suspected of being infected with said computer file to determine if said common block of code is present at a position indicated by said common pointer definition thereby indicating infection by said computer virus.

The invention provides an automated mechanism for generating virus fingerprint data that can be used in detecting a computer virus. This automated mechanism can be applied to a new virus candidate to rapidly generate virus fingerprint data. Whilst such an automated technique may not work in all circumstances, it will work in sufficient circumstances only to require that the most difficult new computer viruses require special handling. Thus, the virus detection mechanism can be developed and released more rapidly.

Whilst searching for matching blocks of code could take place starting from a variety of positions, it is preferable to search following the execution path starting from the entry point for the infected computer file. In order to operate a computer virus must at some point fall upon the execution path and accordingly following this execution path is a good way of consistently identifying the computer virus even though it may be positioned at a variety of different locations within different infected files.

Some computer viruses encrypt themselves within the computer file which they infect. This makes the computer viruses more difficult to detect since in their encrypted form they differ between different infected computer files. However, the computer virus at some point usually decrypts itself into a form that is consistent between different infected computer files. Accordingly, preferred embodiments of the invention operate such that if an adequate detection mechanism cannot be derived directly from the infected computer file, then execution of the computer programs infected with the viruses is emulated until execution of a portion of code written during the emulation is reached.

Execution of a portion of code that has been written during emulation is likely to be a portion of decrypted, or partially decrypted, virus code which increases the probability of consistent matches being achieved between different infected computer files emulated in this way.

If emulation is conducted more than a threshold number of times and a detection mechanism has still not been found, then preferred embodiments recognise this and terminate the attempt to automatically generate the fingerprint data. Such cases may then be passed to an expert human operator for further investigation.

Viewed from another aspect the invention provides a computer program product including a computer program for controlling a computer to automatically generate virus removal data defining how a computer virus may be removed from a computer file infected with said computer virus, said computer program comprising:

virus portion identifying logic operable to identify as virus carrying portions one or more portions of said computer file infected with said computer virus not matching blocks of code within said version of said computer file not infected with said computer virus;

block searching logic operable to search within said virus carrying portions for blocks of code matching a version of said computer file not infected with said computer virus;

pointer identifying logic operable to identify one or more location pointers to said matching blocks of code within said computer file infected with said computer virus;

testing logic operable to test said one or more location pointers to check that they identify matching blocks of code within all of a set of other computer files infected with said computer virus; and removal data generating logic operable to generate said virus removal data representing said one or more location pointers, block sizes and original positions such that virus removal data may be applied to a computer file infected with said computer virus to remove said computer virus.

A complimentary aspect of the invention is the provision of a mechanism for automatically generating virus removal data that may be used to remove a computer virus from a computer file.

It will be appreciated that in some circumstances the ability to clean a computer file may be limited and it may not be possible to recover all of the data from the original uninfected computer file. Preferred embodiments of the invention are such that if a critical portion of the uninfected computer file is not found within the infected computer file, then decryption techniques are applied to the infected computer file to see if it may be recovered. Applying decryption techniques for critical portions only is a good balance between the time taken to attempt to decrypt the infected computer file weighed against the need to recover the particular critical portions of the uninfected computer file.

As previously mentioned, some computer viruses disguise themselves and may also disguise portions of the original computer file in a manner such that if emulation of execution of the infected computer file is undertaken, then portions of the original computer file will be decrypted by the virus itself. Accordingly, preferred embodiments of the invention emulate execution to attempt to find further matching blocks of code.

The emulation performed is only carried out to a threshold number of times before the search for an automatically generated removal technique is terminated and the task passed to a human operator.

Further aspects of the invention also provide a method and an apparatus for automatically generating virus fingerprint data and virus removal data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
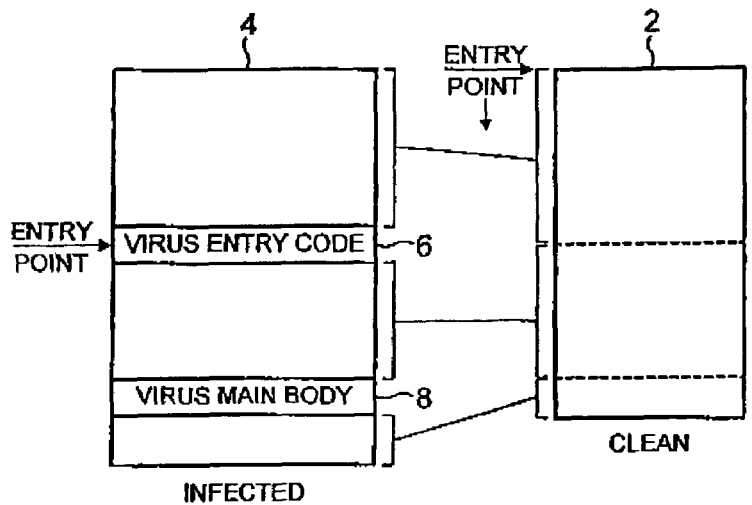
FIG. 1 schematically illustrates a clean version of a computer file and an infected version of a computer file.

FIG. 1 schematically illustrates a clean version of a computer file 2 and an infected version of the same computer file 4, which has been infected by a computer virus. It will be appreciated that this is only one example of how a computer virus may operate. In this example, the computer virus has divided the original clean computer file 2 into three portions and has inserted virus code in the two gaps between these three portions. The original computer program entry point was at the beginning of the clean computer program 2. In the infected computer program 4, the virus has modified the entry point to start execution at a small area of virus entry point code 6. When the infected computer program 4 is executed, the virus entry code 6 is first run and then jumps execution to the virus main body 8. The virus main body 8 may be encrypted, in which case part of the job of the virus entry code 6 would be to decrypt the virus main body 8 and then start executing the decrypted code.

It will be appreciated that a different virus may insert itself at a single point or at more than two points. A virus may serve to vary its insertion position but will typically have some fixed relationship to a reference point within the computer file, e.g. the virus might for example always be found starting a predetermined distance from the end of the computer file, from the beginning of the computer file, from an entry point of the computer file, a certain proportion of the way through a computer file, etc. As well as having common blocks of code, a particular computer virus will also typically have a common way in which it locates itself within the host file and this needs to be identified in order to generate appropriate pointers to the virus that can be used in detection and cleaning mechanisms.

Figure 2:
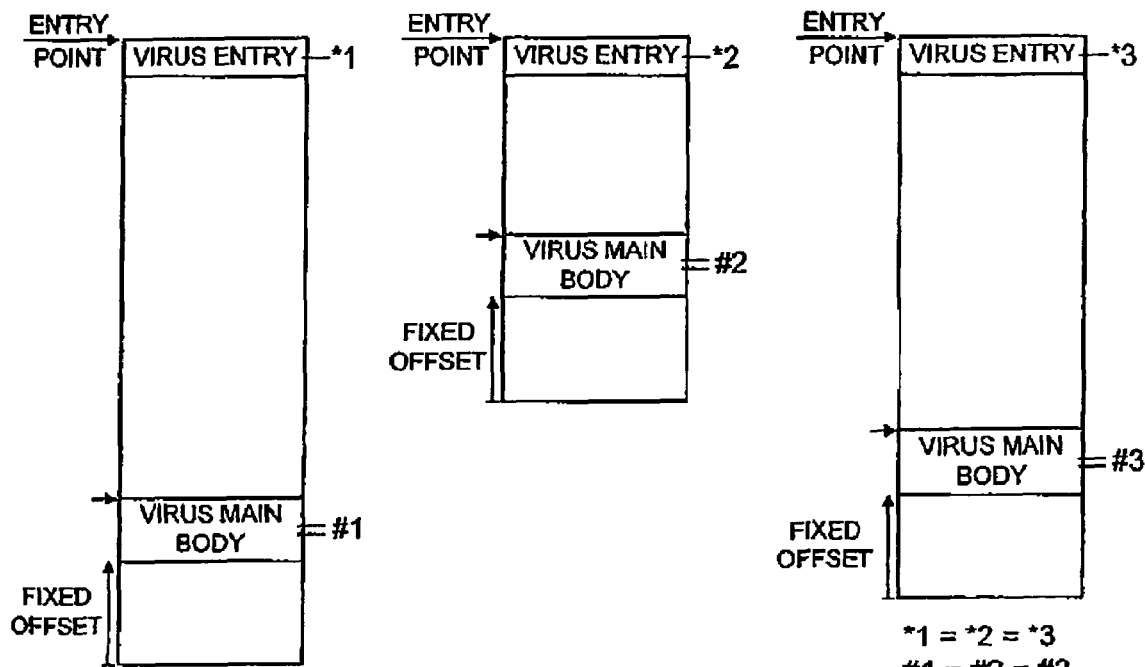
FIG. 2 schematically illustrates three different computer files infected with the same computer virus.

FIG. 2 schematically illustrates three different host computer files each infected with the same computer virus. In these different host computer files, the main virus body is consistently found at a fixed offset from the end of the computer file in question. The virus entry code in these examples is always at the start of the computer file. This contrasts with the FIG. 1 embodiment in which the infected version of the computer file moved the entry point to part way through the computer file. The virus entry code in the three examples of FIG. 2 is identical, as is represented by "$*_1=*_2=*_3$".

In the example illustrated in FIG. 2, the virus main bodies differ between the computer files but a certain portion indicated by "$\#_1=\#_2=\#_3$" is matching between the three different infected files and may be used to identify the virus.

Figure 3:
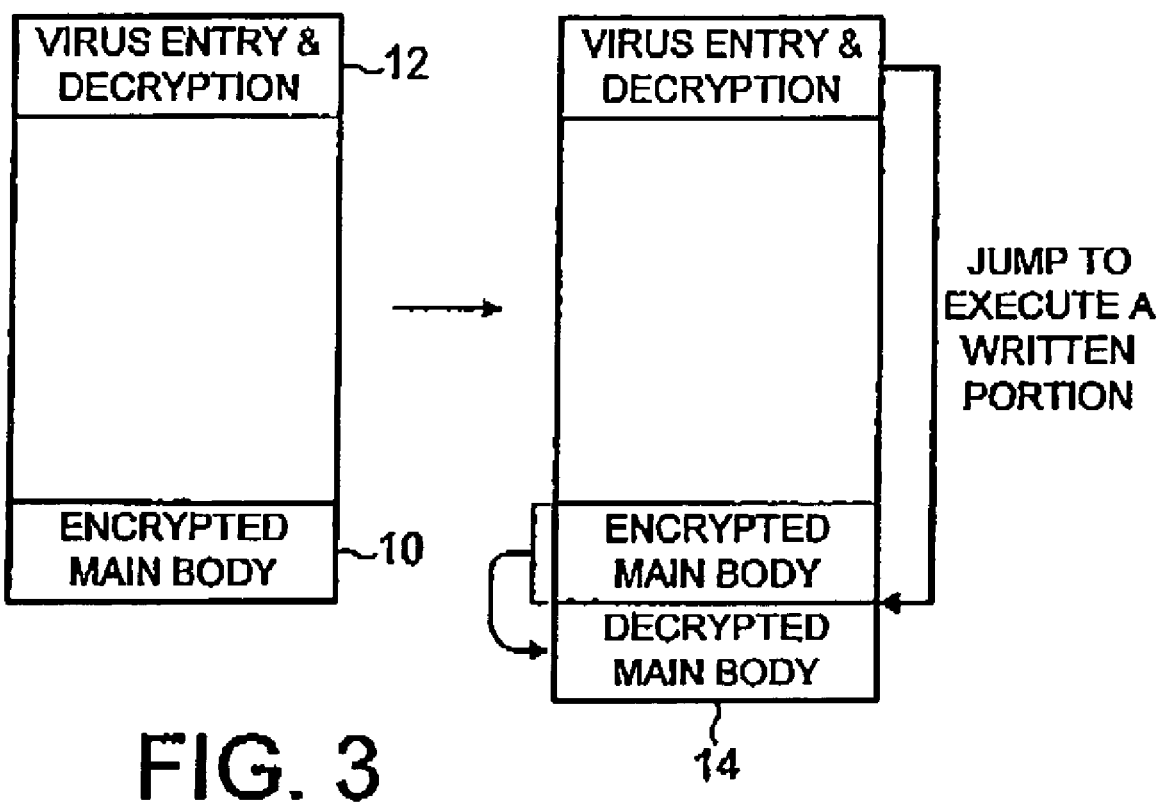
FIG. 3 schematically illustrates a computer virus that seeks to hide itself by encryption and decrypts itself when it runs.

FIG. 3 illustrates the situation in which an infected computer file has an encrypted main virus body 10. Virus entry and decryption code 12 when activated serves to decrypt the main body of the virus and then execute that main body. Such a encryption technique is an attempt by the virus author to make the computer virus more difficult to detect since the same computer virus will not share common main body encrypted code between different infected files.

As is illustrated in FIG. 3, the virus entry and decryption code 12 serves to decrypt the encrypted main body 10 and write a new decrypted main body 14. In this example, the decrypted main body 14 is illustrated as being appended to the end of the computer file. It will be appreciated that the decrypted main body 14 could be written into other locations, such as over the encrypted main body 10, at a new position within the infected computer file, or even in a different area, such as into memory. However, at some point the virus entry and decryption code 12 will jump to start execution of the decrypted main body code 14. It is at this point that an attempt to match common decrypted main body code 14 between different infected computer files may be made. Execution of the infected computer file may be emulated (using known techniques) to identify this point and to generate the corresponding decrypted main body code 14.

Figure 4:
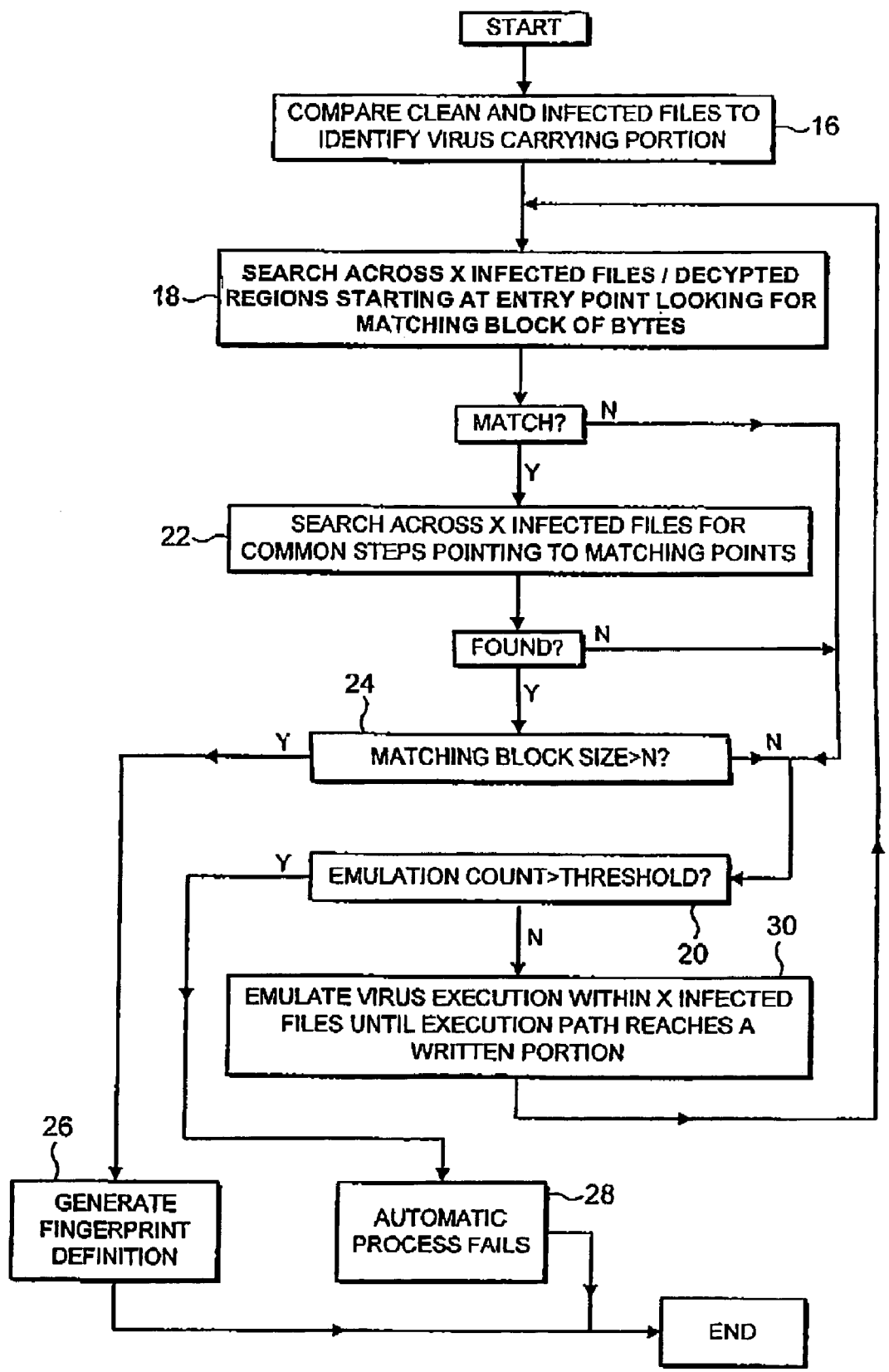
FIG. 4 is a flow diagram schematically illustrating the processing performed when automatically identifying virus definition data.

FIG. 4 schematically illustrates the processing performed to automatically generate virus fingerprint data. As a required input to this example system there are needed a plurality of pairs of clean and infected version of a computer file. At step 16 a clean computer file and a corresponding infected computer file are compared on a byte-by-byte basis to identify matching and non-matching portions, the non-matching portions are identified as the virus carrying portions. Step 16 is repeated for a plurality (X) pairs of clean and infected computer files.

At step 18 a search is made across the plurality of infected computer files (and decrypted regions subsequent to emulation as will be discussed below) starting from their entry points looking within their virus carrying portions for matching blocks of bytes. If no match is found, then processing proceeds to step 20. If a match is found, then processing proceeds to step 22. Step 22 searches across the plurality of infected files within which the matching blocks of bytes have been found to identify common pointers to those matching blocks that may be used in an automatic detection mechanism as part of the fingerprint data. The candidate types of common pointer could take a variety of forms, such as looking for a fixed distance from the start of the file, a fixed distance from the end of the file, a fixed distance from some other reference point within the file etc.

If no common pointer is found, then processing again proceeds to step 20. If a common pointer is found, then step 24 seeks to identify if the matching block of code found across all of the samples of the infected computer file with a derivable common pointer to that block has a size over a threshold value N. If the matching block is too small, then it is not suitable for use in a virus detection mechanism. If the matching block is too small as determined at step 24, then processing proceeds to step 20. If the matching block is over the threshold size as determined at step 24, then processing proceeds to step 26 at which the fingerprint definition data is generated specifying the matching block of bytes that may be searched for and the common position that matching block of bytes will have within an infected computer file.

Step 20 determines whether or not a threshold number of emulation attempts have already been made upon the candidate infected computer files. If emulation has already been tried over a threshold number of times without successfully being able to generate fingerprint definition data, then processing proceeds to step 28 at which the automatic process fails with appropriate generation of an error message and further investigation of the infected computer files manually by an expert in computer viruses is required. If the emulation count has not been exceeded as is identified at step 20, then processing proceeds to step 30 at which emulation of execution of the plurality of infected computer files is performed until for each of the infected computer files the execution point reaches a portion of code that was written during the emulation. This is indicative of the behaviour of a computer virus that seeks to hide itself by encryption which must first decrypt itself before starting to execute the decrypted virus code. Once the plurality of infected computer files have all had their execution emulated up to this point, then processing is returned to step 18 where a fresh search for matching blocks of bytes and common pointers may be made.

Emulation until written memory is executed is not easy to implement and its implementation might use significant system resources. So it can not be considered as a basic emulation operation hence should not be included in removal sequence as a single step. The preferred embodiment may contain an algorithm that tries to replace operation "emulate until written memory is executed" with one or more simple basic emulating techniques. (Examples: "emulate specified number of CPU instructions", "emulate until execution path exceeds specified area", "emulate until particular byte string is found in specified area", etc.) This algorithm may perform emulation until written memory is executed for each infected file in the set, at the same time trying to determine suitable parameters for those basic emulating techniques that would give the same decrypted areas. The algorithm chooses the best technique which have the most similar parameters for all infected files in the set then determines the best parameters that would produce expected decrypted areas for each infected file in the set. Obtained technique along with its parameters are included in the resulting removal sequence (if emulation appears to be necessary).

Figure 5:
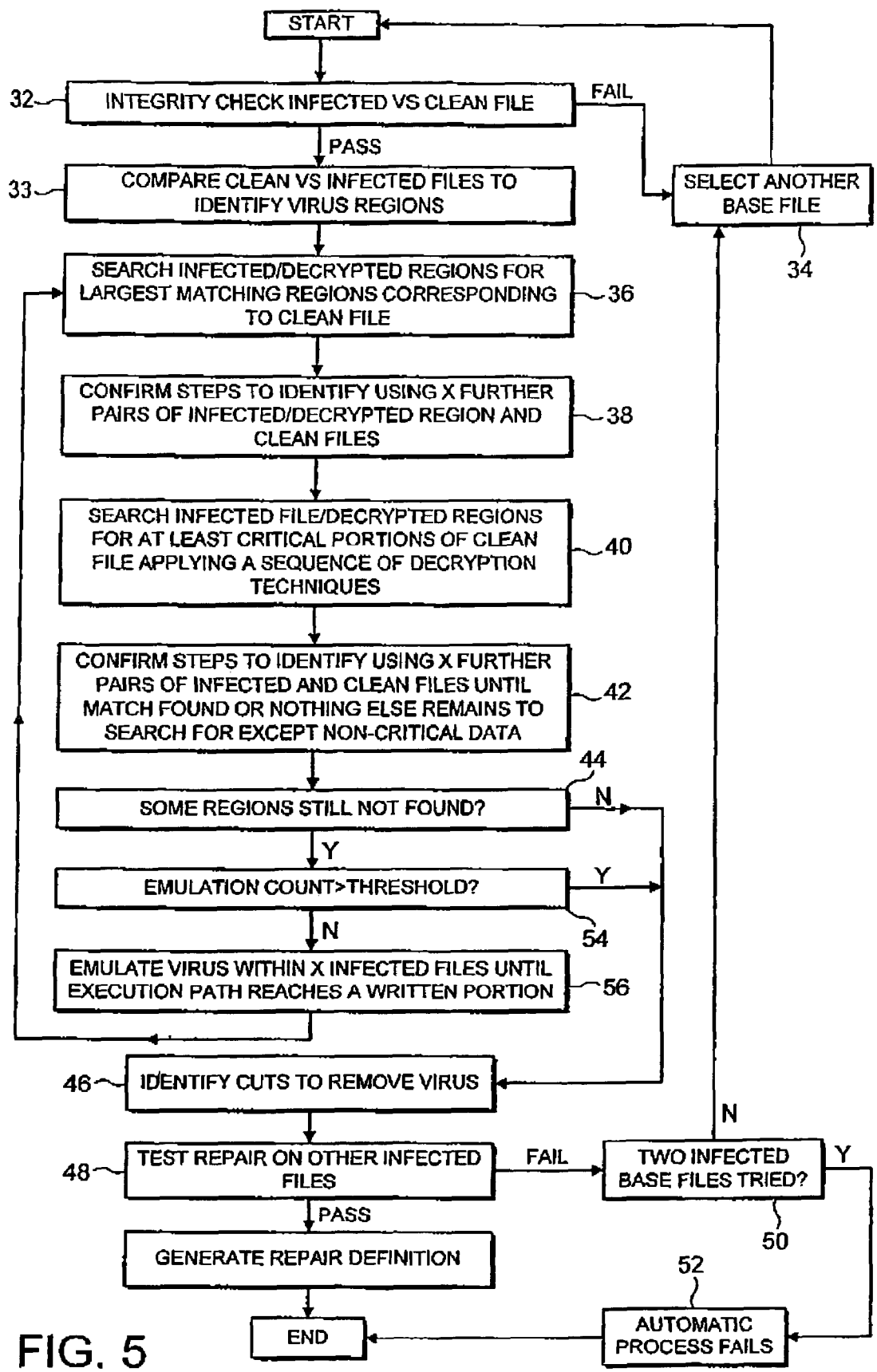
FIG. 5 is a flow diagram schematically illustrating the processing performed when automatically generating virus removal data.

FIG. 5 is a flow diagram illustrating the processing performed in seeking to automatically generate virus removal data. The required input to this example process is at least two pairs of clean and infected files. At step 32, a pair comprising a clean and infected file are integrity checked. In this context, the infected file is checked to see if it is smaller or not significantly larger than the clean file. If the infected file is smaller or not significantly larger than the clean file, then it is highly probable that a large portion of the data contained within the cleaned file has been overwritten and this pair of infected and clean files will not make a good candidate for identifying automatic virus removal data. Accordingly, if the integrity check of step 32 is failed, then processing proceeds to step 34 at which another base file pair are selected.

If the integrity check of step 32 is passed, then processing proceeds via step 33 to step 36. Step 33 compares the clean and infected files to identify virus carrying regions. Step 36 serves to search the infected regions (or on subsequent passes through the processing a decrypted region) for the largest matching block of bytes corresponding to the clean file. A pointer (or a plurality of candidate pointers) to that matching region is also derived. Step 38 serves to confirm the identity of such a region for recovery by testing to see if such a matching region occurs at the same pointed to location within all other pairs of a set of infected files and clean files If there are any critical portions of the infected file that have not been found, then step 40 serves to attempt decryption of the virus carrying portions of the infected computer file using a set of known, and relatively simple, decryption techniques in an attempt to identify the critical portions of the clean computer file that are still missing.

Step 40, then step 42 serves to confirm the decryption in technique and pointer to the data to be decrypted by attempting a recovery of similar critical data in all further example infected computer files until a match is found indicating a reliable way of recovering encrypted critical data.

Step 44 determines whether or not there are still some regions of the clean computer file that have not been recovered. If all of the clean computer file has been recovered, then processing proceeds to step 46 at which the cut points within the infected computer file that identify the remaining virus carrying portions may be identified such that a repair technique may use these to select the virus carrying portions to be removed during the cleaning process. The cut points may be identified in a variety of different ways, such as an end-of-file type marker after rearrangement such that when repairing a file all data after such a marker will be known to be data to be discarded. Alternatively for some viruses, the data to be discarded may be concentrated at the beginning of a file with the file being collapsed with removal of this data as the best step of a repair operation. At step 48, the virus removal data that has been generated is tested on all other further pairs of a set of infected files and clean files to check that it does work. If the technique does not work, then processing proceeds to step 50 which determines whether or not the process has been tried on two infected base files already. If removal data has already been attempted for generation on two candidate base files without success, then processing proceeds to step 52 at which the automatic process fails and an appropriate error message is generated such that the generation of removal data may be referred for manual investigation by an expert. If two infected base files have not already been tried, then processing proceeds to step 34.

If the test at step 44 indicated that some regions of the clean computer file have still not been found, then processing proceeds to step 54. Step 54 determines whether in excess of a threshold number of emulation attempts have been performed upon the infected computer file. If emulation has been performed in excess of this threshold level, then processing proceeds to step 46. If emulation has not yet been tried in excess of the threshold level, then processing proceeds to step 56 at which emulation of execution of the infected computer file and any other infected computer files being used to cross check the data produced is performed until the execution path within those infected computer files reaches a written portion. This corresponds to the computer virus having decrypted a portion of its body or a portion of the original clean computer file. After step 56, processing returns to step 36 at which the searching for matching blocks of bytes and pointers to those matching blocks of bytes as well as critical portions of the clean file are repeated as described above but in this case carried out upon the decrypted regions.

Figure 6:
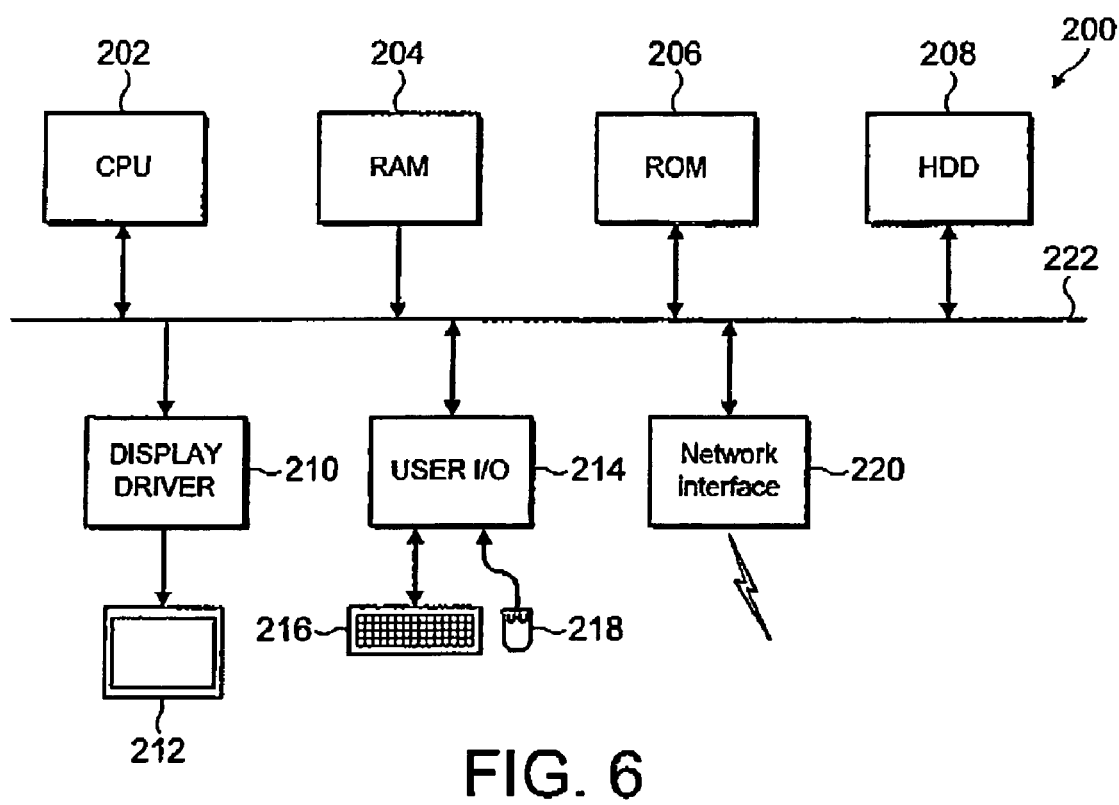
FIG. 6 is a diagram schematically illustrating a general purpose computer of the type that may be used to implement the above described techniques.

FIG. 6 schematically illustrates a general purpose computer 200 of the type that may be used to implement the above techniques. The general purpose computer 200 includes a central processing unit 202, a random access memory 204, a read only memory 206, a hard disk drive 208, a display driver 210 and display 212, a user input/output circuit 214 and keyboard 216 and mouse 218 and a network interface unit 220 all connected via a common bus 222. In operation the central processing unit 202 executes program instructions stored within the random access memory 204, the read only memory 206 or the hard disk drive 208. The working memory is provided by the random access memory 204. The program instructions could take a variety of forms depending on the precise nature of the computer 200 and the programming language being used. The results of the processing are displayed to a user upon the display 212 driven by the display driver 210. User inputs for controlling the general purpose computer 200 are received from the keyboard 216 and the mouse 218 via the user input/output circuit 214. Communication with other computers, such as exchanging e-mails, downloading files or providing internet or other network access, is achieved via the network interface unit 220.

It will be appreciated that the general purpose computer 200 operating under control of a suitable computer program may perform the above described techniques and provide apparatus for performing the various tasks described. The general purpose computer 200 also executes the method described previously. The computer program product could take the form of a recordable medium bearing the computer program, such as a floppy disk, a compact disk or other recordable medium. Alternatively, the computer program could be dynamically downloaded via the network interface unit 220.

It will be appreciated that the general purpose computer 200 is only one example of the type of computer architecture that may be employed to carry out the above described techniques. Alternative architectures are envisaged and are capable of use with the above described techniques.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer readable medium including a computer program for controlling a computer to automatically generate virus fingerprint data for use in detecting computer files infected with a computer virus, said computer program comprising:

comparison logic operable for each of a plurality of computer files to compare a computer file infected with said computer virus with a version of said computer file not infected with said computer virus to identify virus carrying portions of said computer file infected with said computer virus that are not present within said version of said computer file not infected with said computer virus;

block searching logic operable to search within said virus carrying portions of said plurality of computer files infected with said computer virus for a matching block of code exceeding a threshold block size;

pointer searching logic operable to search within said plurality of computer files infected with said computer virus for a common pointer definition identifying a position of said matching block of code within each of said plurality of computer files infected with said computer virus; and fingerprint generating logic operable to generate virus fingerprint data representing said matching block of code and said common pointer definition such that said fingerprint data may be applied to a computer file suspected of being infected with said computer virus to determine if said common block of code is present at a position indicated by said common painter definition thereby indicating infection by said computer virus, wherein if one or more of said block searching logic and said pointer searching logic do not succeed, then emulation logic is operable to emulate execution of each of said computer files infected with said computer virus until execution of a portion of code written during said emulation is reached, whereupon said searching for a matching block of code and said searching for a common pointer definition are repeated;

wherein said searching for a matching block of code starts following an execution path starting at an entry point for each computer file infected with said computer virus;

wherein said emulation is repeated up to a threshold number of emulations, whereupon if one or more of said matching block of code and said common pointer definition are not found then said computer program product is terminated without generating said virus fingerprint data;

wherein said emulation logic is further operable to:
determine parameters for said emulation of each of said computer files infected with said computer virus that result in said portion of code written during said emulation;
identify a best emulation of said emulations of said computer files infected with said computer virus for which said determined parameters are the most similar to said parameters determined for said emulation of each of said computer files infected with said computer virus; and
determine best parameters of said parameters for one of said emulations of said computer files infected with said computer virus that produce expected portions of code written during said emulation for each of said computer files infected with said computer virus:
wherein said best emulation and said best parameters are included in said virus fingerprint data.

2. A computer program product as claimed in claim 1, wherein said emulation is replaced by simplified emulation using one of the following techniques:
(i) a predetermined number of instructions have been emulated;
(ii) emulation of an instruction outside of a predetermined boundary is reached; and
(iii) a predetermined byte string is generated.

3. A computer program product as claimed in claim 1, wherein said computer file infected with said computer virus is integrity checked against said version of said computer file not infected with said computer virus, and said computer file infected with said computer virus is not used in said comparison if said computer file infected with said computer virus is smaller than the version of said computer file not infected with said computer virus.

4. A computer program product embodied on a tangible computer readable medium including a computer program for controlling a computer to automatically generate virus removal data defining how a computer virus may be removed from a computer file infected with said computer virus, said computer program comprising:
virus portion identifying logic operable to identify as virus carrying portions one or more portions of said computer file infected with said computer virus not matching blocks of code within said version of said computer file not infected with said computer virus;
block searching logic operable to search within said virus carrying portions for blocks of code matching a version of said computer file not infected with said computer virus;
pointer identifying logic operable to identify one or more location pointers to said matching blocks of code within said computer file infected with said computer virus;
testing logic operable to test said one or more location pointers to check that they identify matching blocks of code within all of a set of other computer flies infected with said computer virus; and
removal data generating logic operable to generate said virus removal data representing said one or more location pointers, block sizes and original positions such that virus removal data may be applied to a computer file infected with said computer virus to remove said computer virus,
wherein if matching blocks of code have not been found within said computer file infected with said computer virus corresponding to all portions of said version of said computer file not infected with said computer virus, then emulation logic is operable to execute said computer file infected with said computer virus until execution of code written during said emulation is reached, whereupon a further attempt to find said matching blocks of code is made;
wherein said searching for a matching block of code starts following an execution path starting at an entry point for each computer file infected with said computer virus;
wherein said emulation is repeated up to a threshold number of emulations, whereupon if one or more of said matching block of code and one or more of said location pointers are not found ten said computer program product is terminated without generating said virus removal data;
wherein said emulation logic is further operable to:
determine parameters for said emulation of each of said computer files infected with said computer virus that result in said portion of code written during said emulation;
identify a best emulation of said emulations of said computer files infected with said computer virus for which said determined parameters are the most similar to said parameters determined for said emulation of each of said computer files infected with said computer virus; and
determine best parameters of said parameters for one of said emulations of said computer files infected with said computer virus that produce expected portions of code written during said emulation for each of said computer files infected with said computer virus;
wherein said best emulation and said best parameters are included in said virus fingerprint data.

5. A computer program product as claimed in claim 4, wherein for critical portions of said version of said computer file not infected with said computer virus that are not present within said block of matching code, said virus carrying portions are subject to one or more decryption techniques to seek to identify said critical portions within said infected portions such that said virus removal data can specify how to recover said critical portions.

6. A method of automatically generating virus fingerprint data for use in detecting computer files infected with a computer virus, said method comprising the steps of:
for each of a plurality of computer files, comparing a computer file infected with said computer virus with a version of said computer file not infected with said computer virus to identify virus carrying portions of said computer file infected with said computer virus that are not present within said version of said computer file not infected with said computer virus;
searching within said virus carrying portions of said plurality of computer files infected with said computer virus for a matching block of code exceeding a threshold block size;
searching within said plurality of computer files infected with said computer virus for a common pointer definition identifying a position of said matching block of code within each of said plurality of computer files infected with said computer virus; and
generating virus fingerprint data representing said matching block of code and said common pointer definition such that said fingerprint data may be applied to a computer file suspected of being infected with said computer virus to determine if said common block of code is present at a position indicated by said common pointer definition thereby indicating infection by said computer virus, wherein if one or more of said step of searching for a matching block of code and said step of searching for a common pointer definition does not succeed, then emulating execution of each of said computer files infected with said computer virus until execution of a portion of code written during said emulation is reached, whereupon said searching for a matching block of code and said searching for a common pointer definition are repeated;

wherein said searching for a matching block of code starts following an execution path starting at an entry point for each computer file infected with said computer virus;

wherein said step of emulating is repeated up to a threshold number of emulations, whereupon if one or more of said matching block of code and said common pointer definition are not found then said method is terminated without generating said virus fingerprint data;

wherein said emulation logic is further operable to:
 determine parameters for said emulation of each of said computer files infected with said computer virus that result in said portion of code written during said emulation;
 identify a best emulation of said emulations of said computer files infected with said computer virus for which said determined parameters are the most similar to said parameters determined for said emulation of each of said computer files infected with said computer virus; and
 determine best parameters of said parameters for one of said emulations of said computer files infected with said computer virus that produce expected portions of code written during said emulation for each of said computer files infected with said computer virus;

wherein said best emulation and said best parameters are included in said virus fingerprint data.

7. A method as claimed in claim 6, wherein said step of emulating is replaced by simplified emulation using one of the following techniques:
 (i) a predetermined number of instructions have been emulated;
 (ii) emulation of an instruction outside of a predetermined boundary is reached; and
 (iii) a predetermined byte string is generated.

8. A method of automatically generating virus removal data defining how a computer virus may be removed from a computer file infected with said computer virus, said method comprising the steps of:
 identifying as virus carrying portions one or more portions of said computer file infected with said computer virus not matching blocks of code within said version of said computer file not infected with said computer virus;
 searching within said virus crying portions for blocks of code matching a version of said computer file not infected with said computer virus;
 identifying one or more location pointers to said matching blocks of code within said computer file infected with said computer virus;
 testing said one or more location pointers to check that they identify matching blocks of code within all of a set of other computer files infected with said computer virus; and
 generating said virus removal data representing said one or more location pointers, block sizes and original positions such that virus removal data may be applied to a computer file infected with said computer virus to remove said computer virus, wherein if matching blocks of code have not been found within said computer file infected with said computer virus corresponding to all portions of said version of said computer file not infected with said computer virus, then execution of said computer file infected with said computer virus is emulated until execution of code written during said emulation is reached, whereupon a further attempt to find said matching blocks of code is made;

wherein said searching for a matching block of code starts following an execution path starting at an entry point for each computer file infected with said computer virus;

wherein said step of emulating is repeated up to a threshold number of emulations, whereupon if one or more of said matching block of code and one or more of said location pointers are not found then said method is terminated without generating said virus removal data;

wherein said emulation of said is further operable to:
 determine parameters for said emulation of each of said computer files infected with said computer virus that result in said portion of code written during said emulation;
 identify a best emulation of said emulations of said computer files infected with said computer virus for which said determined parameters are the most similar to said parameters determined for said emulation of each of said computer files infected with said computer virus; and
 determine best parameters of said parameters for one of said emulations of said computer files infected with said computer virus that produce expected portions of code written during said emulation for each of said computer files infected with said computer virus;

wherein said best emulation and said best parameters are included in said virus fingerprint data.

9. A method as claimed in claim 8, wherein for critical portions of said version of said computer file not infected with said computer virus that are not present within said block of matching code, said virus carrying portions are subject to one or more decryption techniques to seek to identify said critical portions within said infected portions such that said virus removal data can specify how to recover said critical portions.

10. Apparatus for automatically generating virus fingerprint data for use in detecting computer files infected with a computer virus, said apparatus comprising:
 a comparitor operable for each of a plurality of computer files to compare a computer file infected with said computer virus with a version of said computer file not infected with said computer virus to identify virus carrying portions of said computer file infected with said computer virus that are not present within said version of said computer file not infected with said computer virus;
 a block searcher operable to search within said virus carrying portions of said plurality of computer files infected with said computer virus for a matching block of code exceeding a threshold block size;
 a pointer searcher operable to search within said plurality of computer files infected with said computer virus for a common pointer definition identifying a position of said matching block of code within each of said plurality of computer files infected with said computer virus; and a fingerprint generator operable to generate virus fingerprint data representing said matching block of code and said common pointer definition such that said fingerprint data may be applied to a computer file suspected of being infected with said computer virus to determine if said common block of code is present at a position indicated by said common pointer definition thereby indicating infection by said computer virus, wherein if one or more of said block searching logic and said pointer searching logic do not succeed, then an emulator is operable to emulate execution of each of said computer files infected with said computer virus until execution of a portion of code written during said emulation is reached, whereupon said searching for a matching block of code and said searching for a common pointer definition are repeated;

wherein said searching for a matching block of code starts following an execution path starting at an entry point for each computer file infected with said computer virus;

wherein said emulation is repeated up to a threshold number of emulations, whereupon if one or more of said matching block of code and said common pointer definition are not found then at least a portion of said apparatus is terminated without generating said virus fingerprint data;

wherein said emulation logic is further operable to:
    determine parameters for said emulation of each of said computer files infected with said computer virus that result in said portion of code written during said emulation;
    identify a best emulation of said emulations of said computer files infected with said computer virus for which said determined parameters are the most similar to said parameters determined for said emulation of each of said computer files infected with said computer virus; and
    determine best parameters of said parameters for one of said emulations of said computer files infected with said computer virus that produce expected portions of code written during said emulation for each of said computer files infected with said computer virus;

wherein said best emulation and said best parameters are included in said virus fingerprint data.

11. Apparatus for automatically generating virus removal data defining how a computer virus may be removed from a computer file infected with said computer virus, said apparatus comprising:

a virus portion identifier operable to identify as virus carrying portions one or more portions of said computer file infected with said computer virus not matching blocks of code within said version of said computer file not infected with said computer virus;

a block searcher operable to search within said virus carrying portions for blocks of code matching a version of said computer file not infected with said computer virus;

a pointer identifier operable to identify one or more location pointers to said matching blocks of code within said computer file infected with said computer virus;

a tester operable to test said one or more location pointers to check that they identify matching blocks of code within all of a set of computer files infected with said computer virus; and a removal data generator operable to generate said virus removal data representing said one or more location pointers, block sizes and original positions such that virus removal data may be applied to a computer file infected with said computer virus to remove said computer virus, wherein if matching blocks of code have not been found within said computer file infected with said computer virus corresponding to all portions of said version of said computer file not infected with said computer virus, then execution of said computer file infected with said computer virus is emulated until execution of a portion of code written during said emulation is reached, whereupon said searching for a matching block of code and said searching for a common pointer definition are repeated;

wherein said searching for a matching block of code starts following an execution path starting at an entry point for each computer file infected with said computer virus;

wherein said emulation is repeated up to a threshold number of emulations, whereupon if one or more of said matching block of code and one or more of said location pointers are not found then said apparatus terminates without generating said virus removal data;

wherein said emulation logic is further operable to:
    determine parameters for said emulation of each of said computer files infected with said computer virus that result in said portion of code written during said emulation;
    identify a best emulation of said emulations of said computer files infected with said computer virus for which said determined parameters are the most similar to said parameters determined for said emulation of each of said computer files infected with said computer virus; and
    determine best parameters of said parameters for one of said emulations of said computer files infected with said computer virus that produce expected portions of code written during said emulation for each of said computer files infected with said computer virus;

wherein said best emulation and said best parameters are included in said virus fingerprint data.

12. Apparatus as claimed in claim 11, wherein for critical portions of said version of said computer file not infected with said computer virus that are not present within said block of matching code, said virus carrying portions are subject to one or more decryption techniques to seek to identify said critical portions within said infected portions such that said virus removal data can specify how to recover said critical portions.

13. Apparatus as claimed in claim 11, wherein said emulation is replaced by simplified emulation using one of the following techniques:

(i) a predetermined number of instructions have been emulated;

(ii) emulation of an instruction outside of a predetermined boundary is reached; and (iii) a predetermined byte string is generated.

* * * * *

UNITED STATES PATENT AND TRADEMARK OFFICE
CERTIFICATE OF CORRECTION

| | |
|---|---|
| PATENT NO. | : 7,234,167 B2 |
| APPLICATION NO. | : 09/946505 |
| DATED | : June 19, 2007 |
| INVENTOR(S) | : Teblyashkin et al. |

It is certified that error appears in the above-identified patent and that said Letters Patent is hereby corrected as shown below:

Claim 1, Col. 8, line 48, replace "painter" with -- pointer --;
Claim 1, Col. 9, line 17, replace "virus:" with -- virus; --;
Claim 4, Col. 9, line 57, replace "flies" with -- files --;
Claim 4, Col. 10, line 14, replace "ten" with -- then --;
Claim 8, Col. 11, line 58, replace "crying" with -- carrying --;
Claim 8, Col. 12, line 24, replace "of said" with -- logic --.

Signed and Sealed this

Fifth Day of October, 2010

David J. Kappos
*Director of the United States Patent and Trademark Office*